Oct. 14, 1941.  M. SMOLENSKY  2,258,723

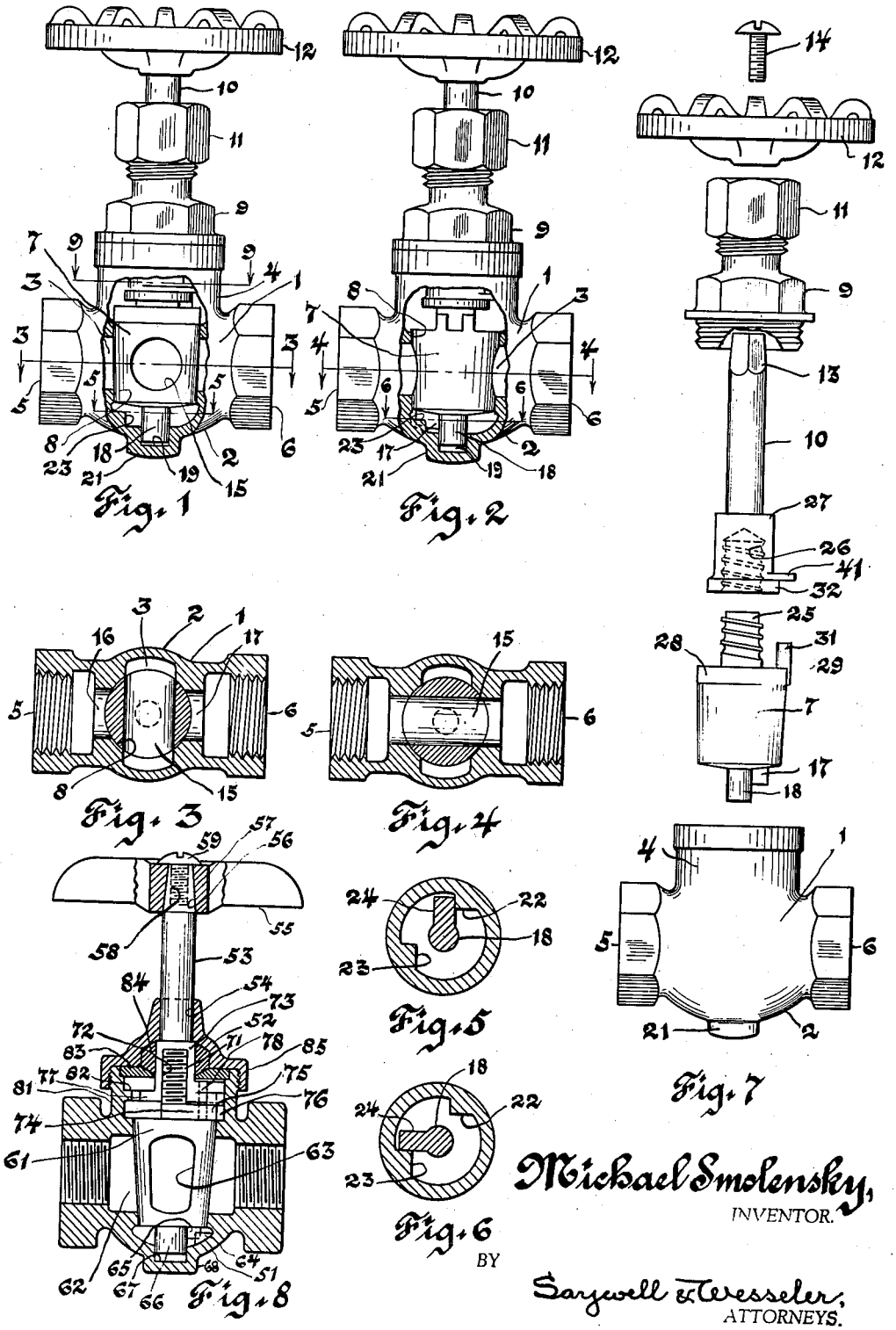

VALVE MECHANISM

Filed Aug. 7, 1939  2 Sheets-Sheet 2

Michael Smolensky,
INVENTOR.

BY Saywell & Wesseler,
ATTORNEYS.

Patented Oct. 14, 1941

2,258,723

UNITED STATES PATENT OFFICE 2,258,723

VALVE MECHANISM

Michael Smolensky, Cleveland, Ohio

Application August 7, 1939, Serial No. 288,706

1 Claim. (Cl. 251—97)

This invention, as indicated, relates to valve mechanism. More particularly it comprises a valve mechanism wherein the valve plug has two distinct motions in going from open to closed position, and reversely. That is, it combines bodily motion in the direction of its axis toward or away from its seat and also rotary motion around its axis, as actuated from a single handle or wheel. The device combines the functions stated in a relatively small number of parts, all positively actuated without the use of springs, and is so constructed that no grinding operations on the valve seat are required. The construction compensates for wear and the contact surfaces increase in the perfection of their sealing relation with continued use. While the operation of the valve handle or wheel requires little effort, the cam surfaces brought into action exert heavy sealing pressure on the sealing parts and the valve is thus exceptionally adapted for heavy duty service with various gases or liquids, including use in high pressure steam lines.

Besides having improved mechanical action the structure provides for notable economies of manufacture over globe and gate valves, requiring housings of relatively small dimensions for valves of capacity equal to valves of other types of construction of much larger size and weight of metal. The construction also provides for full area of fluid passageways when open and firm positive fluid-tight sealing when moved to closed position.

The principal object of the present invention is to provide a valve mechanism of high capacity for the size and weight of the structure.

Another object of the invention is to provide a valve mechanism wherein relatively few easily constructed parts are required and wherein the cost of construction, assembly and maintenance of said parts is reduced to a minimum.

Another object of the invention is to provide a valve mechanism wherein no springs or fragile breakable parts are required and where no ground seats for the valve members are used.

Another object of the invention is to provide a valve mechanism having positive opening and closing action utilizing heavy pressures without undue wear on the parts, and without involving excessive operative effort.

Another object of the invention is to provide a valve mechanism operable from a single handle wherein a movable valve member may be rotated and displaced axially.

A further object of the invention is to provide a valve mechanism of neat appearance, high efficiency and long service life at high duty without attention.

Other and further objects of the invention will appear in the course of the following description.

To the accomplishment of the foregoing and related ends, said invention, then, consists of the means hereinafter fully described and particularly pointed out in the claim, the annexed drawings and the following description setting forth in detail certain mechanism embodying the invention, such disclosed means constituting, however, but several forms in which the principle of the invention may be used.

In said annexed drawings:

Fig. 1 is a side elevation partly in section showing a valve mechanism embodying the principle of the invention, the valve plug being turned to closed position;

Fig. 2 is a view similar to Fig. 1, but showing the valve plug turned to open position;

Figure 9:
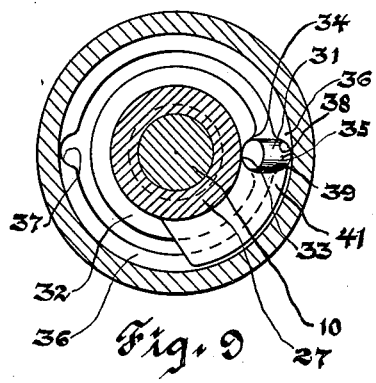
Figure 10:
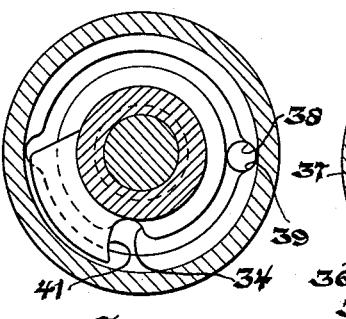
Figure 11:
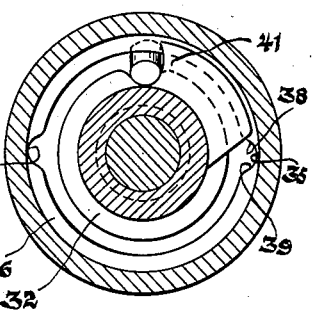
Figure 12:
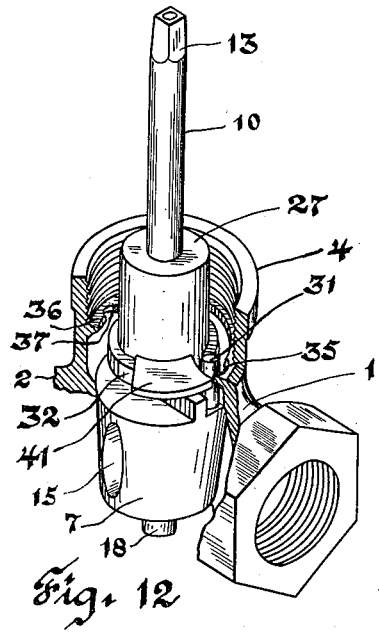
Figure 13:
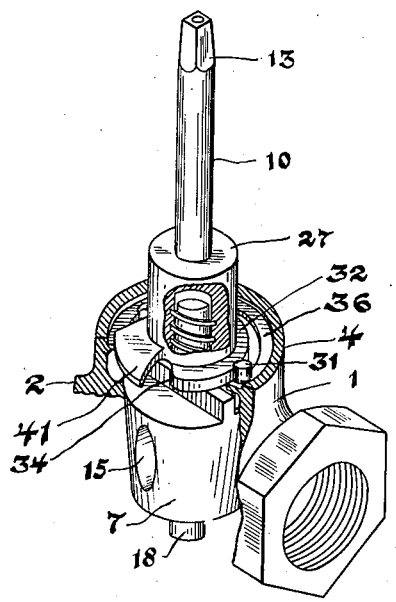
Figure 14:
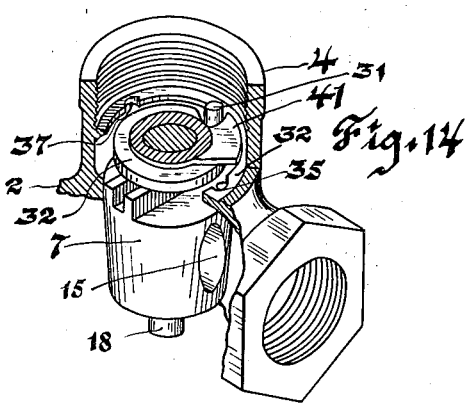

Figs. 3 and 4 are transverse central sectional views of the valve mechanism taken along the lines 3—3 and 4—4, shown in Figs. 1 and 2, respectively;

Figs. 5 and 6 are transverse sectional views taken along the lines 5—5 and 6—6, shown in Figs. 1 and 2, respectively, illustrating the closed and open position of the valve stop lug in relation to the limit stop members on the casing;

Fig. 7 is a disassembled, or exploded, view of the valve mechanism as seen in elevation;

Fig. 8 is a central vertical sectional view of a modified form of valve mechanism embodying the principles of the invention;

Fig. 9 is a transverse sectional view as seen along the line 9—9 shown in Fig. 1, with the pin intermediate the unlocked and interlocking position and the valve stem on the line between its valve rotating and valve displacing arcs of travel;

Fig. 10 is a similar view but showing the pin in unlocked position and the valve stem moved along its valve displacing arc of travel;

Fig. 11 is a view similar to Fig. 9 but showing the pin in locked position and the valve stem moved along its valve rotating path of travel;

Fig. 12 is a fragmentary perspective view partly in section showing the pin and valve stem in the relative positions shown in plan in Fig. 9;

Fig. 13 is a view similar to Fig. 12 showing the pin and valve stem in the relative positions shown in Fig. 10, and with parts broken away to illustrate the screw-threaded cam member and socket; and Fig. 14 is a view similar to Fig. 12 showing the pin and valve stem in the relative positions shown in Fig. 11.

As is clearly shown in Figs. 1 to 6, inclusive, the preferred form of valve mechanism comprises a valve casing 1 preferably having a slightly enlarged central area 2 to provide a chamber 3 to receive the valve plug and having a cylindrical extension 4 communicating therewith. In the form illustrated the central chamber has opposite ports 5, 6, which may be connected with inlet and outlet pipes (not shown) by means of the usual screw-threaded connections. Obviously the valve ports may be arranged in angular relation, or a plug having one or more full or partial openings at the top or bottom may be provided with suitable passageways where required through the casing.

The cylindrical extension 4 is of a size to admit a valve plug 7 of inverted frusto-conical outline as seen in elevation, and the valve chamber is formed with complementary bearing surfaces adjacent the valve ports to provide a seat 8 for the valve plug. The chamber is suitably recessed above and below the sealing surfaces of the valve seat to provide for free assembly of the parts and for wear, and also to accommodate the actuating, centering and motion limiting members presently to be described. The cylindrical extension is closed by the bonnet 9 suitably apertured to receive the valve stem 10, and may carry a packing gland 11, screw-threadly engaged thereon. The stem at its upper end may have a wheel 12, or any other desired type of handle, being shaped at its upper end with flat tapered faces 13 to be engaged with coacting faces in a recess in the hub of the wheel and locked thereto by a central screw H engaging an axial screw-threaded opening in the end of the stem.

The valve plug is suitably apertured to provide a fluid passageway, which, in the form illustrated, is a straight transverse opening 15 preferably of the full capacity of the inlet and outlet pipes, or other connections, and registering when in open position with the adjacent openings 16, 17, in the walls of the valve chamber. At its free end the valve plug 7 is provided with a central stub shaft 18 adapted to be received at its lower end within a central recess 19 formed in the bottom wall of the valve chamber 21, or an extension thereof in axial alinement with the valve stem presently to be described. The bottom wall of the valve chamber is also provided with limit stop members 22, 23 preferably formed as integral projections or shoulders, as best shown in Figs. 5 and 6. The valve plug is provided on its under face at one side of the stub shaft with a stop lug 24 which has free movement for a quarter turn before engaging the respective shoulders 22, 23, which thus define the full closed and full open positions, respectively.

It will be noted that the recess 19 is of sufficient depth to accommodate the end of the stub shaft 18 in the event of wear on the sealing surfaces of the valve seat or plug, and the tapered surface of the plug may be slightly relieved above the area of the sealing surface to prevent the formation of a shoulder to restrict downward movement of the plug in the course of long continued use in heavy duty service. A four degree taper is very effective.

The upper end of the valve plug, as shown more particularly in Figs. 7 and 13, is provided centrally with a screw-threaded cam member 25 coacting with a screw-threaded cam socket 26, formed in an enlargement 27 at the lower end of the valve stem 10. The screw threads are formed in a direction to project the plug toward its seat axially upon the turning of the valve handle 12 in a clockwise direction, and to lift the plug from its seat when the valve handle is turned in the reverse direction, during a predetermined arc of travel of the valve stem as will be explained hereinafter.

On opposite sides of the cam member 25, the upper face of the valve plug is provided with recessed bosses 28, 29, open at the respective sides of the plug. Two recesses are thus provided for selective mounting of the locking pin 31, one end of which is loosely seated in the selected recess for the range of turning movement desired, as will be hereinafter explained. The pin 31 serves as the means for locking the plug to the valve stem during a predetermined arc of movement of such stem and is held free of engagement with the valve stem during another predetermined arc of movement of the valve stem.

The action just referred to, of moving the pin to locking and unlocking position, is brought about by means of coacting cam surfaces on the valve stem end on the inner wall of the cylindrical extension of the casing, as will be most clearly understood by reference to Figs. 9 to 14 of the drawings.

The valve stem 10, it will be noted, is formed at the free end of the enlargement 27 with a cam ring 32 which is cut away to provide a notch or recess 33. The recess 33 is of a size to receive the pin 31 when the same is forced inwardly against the side wall of the enlargement at the position of said recess. At one side of the recess the ring is formed with an abrupt cam face 34, which when moved against the pin through clock-wise closing rotation of the stem forces the pin outwardly into a notch or recess 35 provided in a cam ring 36 provided on the inner wall of the cylindrical extension of the casing in substantially the plane of the cam ring 32 on the valve stem. The cam ring 36 may have a second notch or recess 37 opposite the notch or recess 35 in order to permit a different positioning of the pin and the use of a different range of movement of the plug under special requirements and also by providing different limit stops, if desired.

Only one of the notches in the ring 36 is required for the plug assembly and limit stops 22, 23, with lug 24, as above described, and this is the notch 35 first mentioned. At each side of the notch are abrupt cam faces 38, 39, which act on the pin in conjunction with the cam faces on the valve stem unit, to move the pin to the locking or unlocking position according to the direction of rotation of the valve stem unit.

The movement of the pin toward the enlargement on the valve stem is accomplished by means of a cam in the form of a hook 41, provided as a separate member attached to the valve stem enlargement immediately above the ring. This hook-shaped cam extends outwardly almost to the inner wall of the casing and projects above the ring 36. The inner face of the hook 41, as is clearly shown in Figs. 9 to 14, engages partially behind the pin 31 and in conjunction with the cam 38 on the opposite side of the notch 35 serves to move the pin into the notch 33 on the valve stem unit. It should be mentioned that the pin is rolled against the cam faces and that the amount of wear on the pin and on the cam faces is greatly reduced by this non-friction rolling action.

The construction above described provides for a valve mechanism of few parts and compact construction and requires a minimum amount of metal in its fabrication. However, where the fluid pressures to be taken care of are not excessive still further economies can be brought about by dispensing with the separate packing gland and providing a bonnet to serve as a packing gland as well as its regular function as a housing and bearing for the valve stem unit. A construction of this character is shown in Fig. 8, wherein the casing 51 itself is made lighter in weight though a reduction of its length, and wherein the bonnet 52 carries the packing members.

The valve stem 53 is guided in the bearing 54 in the upper part of the bonnet and at the upper part of the stem there is provided the conventional hand-wheel 55 with a tapered polygonal opening 56 in the hub engaging with the tapered polygonal end 57 of the stem, which has the screw-threaded axial opening 58 to receive the locking screw 59. The pipe ends (not shown) are brought closer to the valve plug in this modified type of construction and the plug 61 coacts directly with side walls of the valve chamber 62 to form a fluid-tight seal. The valve plug is made narrower and the fluid passageway 63 therethrough is made longer in an axial direction as shown in Fig. 8. This with the elimination of the inner walls of the valve chamber makes possible the shortening of the casing and the reduction of weight.

The casing is provided with stop shoulders 64 and the plug carries a stop lug 65 to coact therewith. The plug is also provided with a stub shaft 66 and the casing with a recess 67 to receive the same, the casing preferably having an extension 68 to accommodate such recess. The valve plug at its upper end carries a screw-threaded cam member 71 received in a socket 72 in an enlargement 73 at the lower end of the valve stem unit 53. These elements are preferably all made of smaller diameter than in the type of construction first described. The cam member rises directly from the top face of the plug and has an extension 74 at one side only, providing a socket 75 for the locking pin 76. The enlargement on the valve stem unit has a cam ring 77 and a hook member 78 similar to the preferred type of construction, and the operation of the device is simple.

The cylindrical extension 81 through which the plug is engaged with the valve seat is formed with a circular shoulder 82 to receive a sealing washer 83 having a beveled central area adjacent the valve stem to provide a depression to receive the lower portion of packing material 84 of convex outline as seen in cross-section. The bonnet 52 is provided with a recessed area with an end face of similar shape to receive the balance of the packing material and to cooperate in pressing the packing in liquid-tight engagement with the valve stem, immediately below the stem guide passageway 54 heretofore described. The bonnet carries a depending flange 85 at its lower end which is screw-threaded internally to end external screw-threads at the upper outer edge of the cylindrical extension of the casing.

The operation of the device has been described in connection with the explanation of its construction. However, by way of brief summary it may be stated that with the valve in open position the limit stop 23 and lug 24 prevents further turning of the valve to the left or in a counter-clockwise direction. Upon rotation to the right the cam 34 of the cam ring carries the pin around a quarter turn of the casing to the recess into which the pin is forced with rolling action by said cam in conjunction with the cam surface on the casing cam ring, the lug 24 on the plug then contacting the shoulder of the limit stop 22 on the casing. After the pin enters the recess the valve stem is free to turn still further to the right while the plug is held against such rotation by the pin locking with the recess in the casing and the lug contacting the limit stop. When the valve stem is turned to the right after the plug reaches its limit of motion the screw-threaded socket 26 in the stem acts to force the plug downwardly on an axial line against its seat. The sealing action thus brought about is very effective and this frictional action with each repetition produces a still more perfect seat. The axial movement of the plug is preferably adjusted for very close clearances which limits the amount of wear and restricts the arc of travel of the wheel or handle for locking and unlocking movement. In opening the valve the steps just recited are reversed, a movement of not over a quarter turn to the left serving to lift the plug and bring the hook 41 into contact with the pin which is then moved inwardly to clear the notch 35 and enter the recess 33 on the valve stem unit. This last-mentioned movement locks the plug to the valve stem which then is rotated a quarter turn to full open position when the lug 24 will again contact the limit stop shoulder 23, which completes the full cycle of moving the valve from open to closed position and then again back to full open position.

Other modes of applying the principle of my invention may be employed instead of those explained, change being made as regards the mechanism herein disclosed, provided the means stated by the following claim or the equivalent of such stated means be employed.

I therefore particularly point out and distinctly claim as my invention:

A valve mechanism having in combination a casing having inlet and outlet ports, a tapered valve seat intermediate the same, a plug unit adapted to snugly engage said seat and having a passageway therethrough adapted to be rotated into and out of registry with said ports, a valve stem unit having screw-threaded engagement with said plug unit, a roller pin having its lower end portion loosely mounted in a recess in the top of said plug unit and having its upper end portion movable into and out of locking engagement alternatively with said stem unit and said casing, a hook-shaped cam carried on said stem unit and engaging behind the upper end of said pin for moving said upper end from locking engagement with said casing into locking engagement with said stem unit, and a second cam carried on the stem unit for engaging and moving the upper end of the pin from locking engagement with the stem unit into locking engagement with the casing.

MICHAEL SMOLENSKY.